United States Patent
Painter et al.

(10) Patent No.: US 12,473,219 B2
(45) Date of Patent: Nov. 18, 2025

(54) WATER MANAGEMENT SYSTEM FOR ORE MINING OPERATION

(71) Applicant: EXTRAKT PROCESS SOLUTIONS, LLC, Bowling Green, KY (US)

(72) Inventors: Paul C. Painter, Boalsburg, PA (US); Bruce G. Miller, Boalsburg, PA (US); Aron Lupinsky, Boalsburg, PA (US)

(73) Assignee: EXTRAKT PROCESS SOLUTIONS, LLC, Bowling Green, KY (US)

( * ) Notice: Subject to any disclaimer, the term of this patent is extended or adjusted under 35 U.S.C. 154(b) by 471 days.

(21) Appl. No.: 17/917,311

(22) PCT Filed: Apr. 9, 2021

(86) PCT No.: PCT/US2021/026506
§ 371 (c)(1),
(2) Date: Oct. 6, 2022

(87) PCT Pub. No.: WO2021/207564
PCT Pub. Date: Oct. 14, 2021

(65) Prior Publication Data
US 2023/0143928 A1    May 11, 2023

Related U.S. Application Data

(60) Provisional application No. 63/007,548, filed on Apr. 9, 2020.

(51) Int. Cl.
*C02F 9/00*    (2023.01)
*C02F 1/24*    (2023.01)
(Continued)

(52) U.S. Cl.
CPC .................. *C02F 9/00* (2013.01); *C02F 1/24* (2013.01); *C02F 1/442* (2013.01); *C02F 1/56* (2013.01);
(Continued)

(58) Field of Classification Search
None
See application file for complete search history.

(56) References Cited

U.S. PATENT DOCUMENTS

2013/0161255 A1 * 6/2013 Neculaes ................ C02F 11/12
210/632
2015/0014248 A1    1/2015 Herron et al.
(Continued)

FOREIGN PATENT DOCUMENTS

WO    2018/144336 A1    8/2018
WO    2020/172265 A1    8/2020

OTHER PUBLICATIONS

Moreno et al., The use of seawater as process water at Las Luces copper-molybdenum beneficiation plant in Taltal (Chile), Minerals Engineering, Apr. 24, 2011, pp. 852-858 (Year: 2011).*

(Continued)

*Primary Examiner* — Peter Keyworth
(74) *Attorney, Agent, or Firm* — Morgan, Lewis & Bockius LLP

(57) ABSTRACT

Processes of extracting mineral deposits in ore include treating a saline source, e.g., seawater, to reduce a concentration of one or more multivalent ions (e.g., $Ca^{2+}$, $Mg^{2+}$, $SO_4^{2-}$) dissolved in the saline source by passing the seawater through one or more nanofilters to produce treated saline water while maintain a certain concentration of dissolved monovalent ions (e.g., ($Na^+$, $K^+$ and $Cl^-$) in the treated saline water. The treated saline water can be used in an operation to extract minerals from ore such as in a flotation operation to extract minerals from ore, or to consolidate tailings generated from an extraction of minerals from ore, or both.

20 Claims, 4 Drawing Sheets

(51) Int. Cl.
  *C02F 1/44*      (2023.01)
  *C02F 1/56*      (2023.01)
  *C02F 11/131*    (2019.01)
  *C02F 101/10*    (2006.01)
  *C02F 103/08*    (2006.01)
  *C02F 103/10*    (2006.01)

(52) U.S. Cl.
  CPC ....... *C02F 11/131* (2019.01); *C02F 2101/101* (2013.01); *C02F 2103/08* (2013.01); *C02F 2103/10* (2013.01)

(56) References Cited

U.S. PATENT DOCUMENTS

2016/0229705 A1　8/2016　St. John et al.
2018/0345337 A1　12/2018　Huang et al.

OTHER PUBLICATIONS

International Search Report (PCT/ISA/210) issued in PCT Application No. PCT/US2021/026506 dated Jul. 13, 2021.
Written Opinion (PCT/ISA/237) issued in PCT Application No. PCT/US2021/026506 dated Jul. 13, 2021.

* cited by examiner

Initially mixed and poured into measuring cylinder 41 seconds later

WATER MANAGEMENT SYSTEM FOR ORE MINING OPERATION

CROSS-REFERENCE TO RELATED APPLICATIONS

This application claims the benefit of U.S. Provisional Application No. 63/007,548 filed 9 Apr. 2020, the entire disclosure of which is hereby incorporated by reference herein.

TECHNICAL FIELD

The present disclosure relates to processing ore with saline sources such as seawater and consolidating tailings from such processes. In particular, the present disclosure relates to treating a saline source by nanofiltration to reduce one or more multivalent ions dissolved in the saline source while maintaining a high concentration of dissolved monovalent salts to produce treated saline water and using the treated saline water in extracting mineral deposits in ore and/or using the treated saline water for consolidating tailings generated in ore processing operations.

BACKGROUND

Water is essential to the mining industry. Large volumes are used not only in processing ores to extract valuable minerals, but also in the transportation of ores, ore concentrates and tailings. Tailings are the waste materials left after extraction of the ore of value.

For example, froth flotation is used to separate valuable minerals in ore from components with no commercial value (gangue). Typically, flotation takes place in slurries containing 25% to 30% of solids by weight, so that without recycling of water up to 3 cubic meters (~793 gallons) of water are needed per metric ton (tonne) of ore processed.

Growing demand for minerals has put significant pressure on fresh water supplies. Compounding the problem, much of the world's mineable mineral reserves, such as copper and other valuable minerals, are located in arid regions. U.S. copper deposits, for example, are found in the dry Western parts of the country. Australian copper mines are located in the arid southern part of the continent. In Australia, artesian sources are presently being used in mining operations and this has threatened so-called mound springs that are the only local source of fresh water. Most Chilean copper mines are located in the Atacama Desert, among the driest places on earth and more than 100 km from the coast. For example, the Escondida copper, gold and silver mine, the largest producer of copper in the world, is located 160 km southeast of the port of Antofagasta at an elevation of more than 3000 m above sea level.

Substantial amounts of water from mining operations are discharged to the environment, usually to impoundments that are also called tailings ponds or tailing storage facilities. Depending on the mine, the water can be contaminated by minerals containing elements such as arsenic or mercury that were originally locked in the parent mineral ore. Contamination also occurs by water entrainment of chemicals used in processing. These contaminants can leach into aquifers, threatening water supplies. In addition, impoundment dams periodically fail with catastrophic environmental consequences and loss of life.

Reverse osmosis is used to desalinate seawater for certain mining extraction operations. For example, the Chilean Copper Commission estimated that a total of about 10,000 $m^3$/hour of seawater was desalinated for copper mine extraction in 2016 and this number would triple in the following 10 years. The Olympic Dam mine in Australia uses desalination to treat the saline water pumped from Artesian Wells. Because lower grade ores are now being mined world-wide, more water will be required per ton of copper produced. Demand for copper is also anticipated to grow.

The cost of seawater desalination in Chile is twice that in the U.S., about $5/$m^3$. In many regions there is also a very large cost associated with pumping desalinated water inland to mine sites for extraction processes. Jeldress et al.; Mineral Processing and Extractive Metallurgy Review 2016, 37 (6), 369-384. In 2018

Desalination introduces various environmental problems associated with brine disposal. The brine has a salt concentration of about 7% (relative to ~3.5% in seawater). It is also contaminated by the chemicals used in water pretreatment and cleaning. See Mavukkandy et al.; Desalination 2019, 472, 114187. The local change in salinity at discharge points in the ocean has been shown to adversely affecting certain marine species and also results in periodic large algal blooms, depleting oxygen levels and harming fish and other species. See Chavez-Crooker et al.; Current Biotechnology, 2015, Volume 4 (3), 1-14.

Sustainable water use in copper and other mineral processing operations is crucial to the industry. Recycling as much water as possible is one important approach. Presently, after flotation and removal of the concentrated copper (or other mineral) ore, a slurry of process water and gangue is sent to thickeners, where some process water is recovered for recycling. However, a significant amount of water is lost to the thickened solids or tailings, which usually have a solids content of no more than 50% to 55%.

There is a clear need in the industry for a water management system that integrates various processes to address a range of water problems. This includes allowing higher levels of process water recycling, which can result in lower amounts of replacement water and reduced pumping costs; reducing brine disposal requirements; managing process water chemistry to improve metal recoveries and address environmental concerns; and elimination or large reduction in size of wet impoundments to address both safety and groundwater contamination.

SUMMARY OF THE DISCLOSURE

Advantages of the present disclosure include processes of extracting mineral deposits in ore. The processes of the present disclosure advantageously use a treated saline source, e.g., seawater, for mineral extraction or tailings consolidation.

These and other advantages are satisfied, at least in part, by a process of extracting mineral deposits in ore by treating a saline source to reduce a concentration of one or more multivalent ions dissolved in the saline source by nanofiltration to produce a treated saline water having a concentration of dissolved monovalent salts of at least 0.5 wt %. The treated saline water can then be used in a flotation operation to extract minerals from ore. Alternatively, or in combination, the treated saline water can be used to consolidate tailings generated from an extraction of minerals from ore operation.

Advantageously, treating a saline source by nanofiltration produces a treated saline water with a relatively low concentration of dissolved multivalent ions but maintains a relatively high concentration of dissolved monovalent ions. For example, a treated saline source by nanofiltration can produce treated saline water having a concentration of any one of, or a concentration all of, $Mg^{2+}$, $Ca^{2+}$, $SO_4^{2-}$ ions to no more than about 200 ppm (such as no more than about 175 ppm, 150 ppm, 125 ppm, 100 ppm, 75 ppm, 50 ppm, 30 ppm, 20 ppm, 10 ppm and values therebetween) and a concentration of dissolved monovalent salts, e.g., sodium and potassium chloride, of no less than about 0.5 wt % (such as at least about 1 wt %, 1.5 wt %, 2 wt %, 2.5 wt % and even at least about 2.9 wt %). Advantageously, processes of the present disclosure can treat a saline source with high throughput such as treating at least 30 m$^3$/hr of a saline source and in many instances treating at least 100 m$^3$/hr a saline source.

Embodiments of the present disclosure include one or more of the following features individually or combined. For example, the treated saline water can be used to extract minerals from ore which generates tailings and treating the tailings with a flocculant to form a treated tailings including consolidated solids in process water.

Treating a saline source to reduce a concentration of one or more multivalent ions dissolved in the saline source by passing the seawater through one or more nanofilters to produce treated saline water. The treated tailings can have a concentration of dissolved monovalent salts of at least about 0.5 wt %, which facilitates fast consolidation of solids in the tailings. In some embodiments, the tailings can also be dosed with a polymer flocculant such as a non-ionic polymer flocculant to form a treated tailings including consolidated solids in process water. Advantageously, the consolidated material can have a solids content of at least 50 wt % or higher such as at least 55 wt %, or 60 wt % or higher.

In other embodiments, the process water from the consolidated solids can be separated and at least a portion thereof cycled to the ore extraction operation or subjected to a purification step, e.g., a second nanofiltration step or a reverse osmosis step.

In other aspects, consolidated tailings generated from treating tailings with treated saline water can be dewatered by a finishing step involving one or more thermal methods. Such a thermal method can control the water content of the consolidated tailings, which can be mostly dewatered tailings, to satisfy geotechnical requirements that may prove uneconomic or technically difficult to achieve this through mechanical methods. Thermal methods that can be used as a finishing step on consolidated tailings include, for example, convection driers, contact driers, radiation heat transfer driers and/or microwave driers.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein.

DETAILED DESCRIPTION OF THE DISCLOSURE

Figure 1:
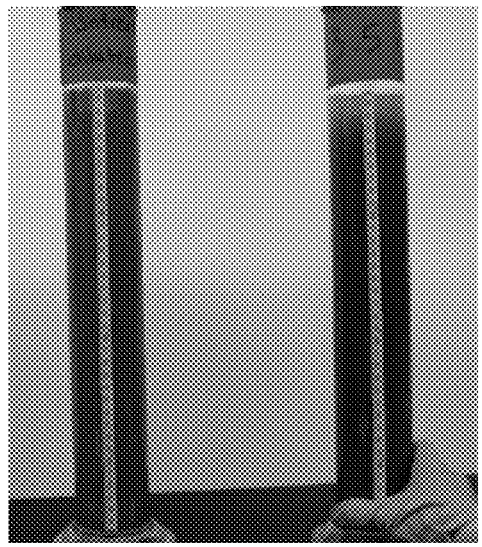
FIG. 1 shows samples of copper tailings mixed with an equal volume of tap water (left) and a 3.5 wt % modified sea salt solution (right) containing polyacrylamide and poured into measuring cylinders. The top picture in the figure shows the results immediately after mixing the copper tailings with either tap water or the salt/polymer flocculant solution into the cylinders and the bottom picture shows results 41 seconds later.
Figure 1:
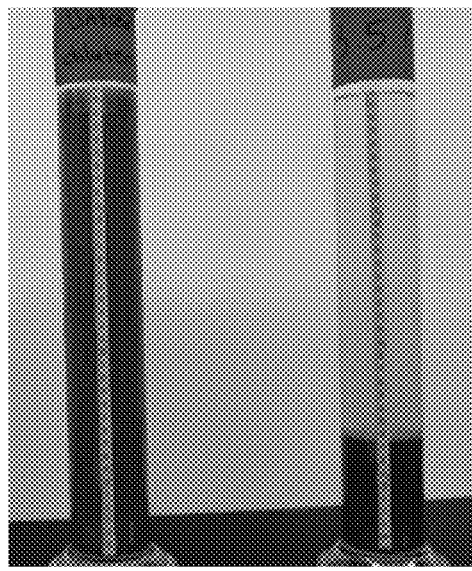

The present disclosure relates to processing ore such as one or more metal-based ores, e.g., aluminum, copper, zinc, lead, gold, silver, iron, uranium-based ores, etc., or non-metal-based ore, e.g., phosphate ores, etc. The ore can be processed with a treated saline source, such as treated seawater. In addition, or in combination, the treated saline source can be used to consolidate tailings generated from an ore processing operation. Typically mined ore is processed by forming a slurry of ground ore with water which is then subjected to a concentration operation in a concentrator plant. The concentration operations can include one or more flotation operations and/or one or more solvent extraction operations, leaching operations, etc. to concentrate desirable minerals, e.g., metal-based minerals such as copper-based minerals, from the slurry to form a mineral-rich concentrate stream and a tailings (waste) stream. The mineral-rich concentrate stream is further processed to produce desirable materials. The tailings stream is typically transported to a tailings storage facility and, in some instances, the tailings are thickened to recover process water and generate a higher solids content tailings stream prior to being transported to the tailings storage facility.

In an aspect of the present disclosure, a saline source is treated by nanofiltration to reduce one or more multivalent ions dissolved in the saline source to produce treated saline water having a high concentration of dissolved monovalent ion salts, e.g., sodium chloride. The treated saline water can be used in extracting mineral deposits in ore and/or can be used for consolidating tailings generated in ore processing operations. Saline sources as used herein refer to a natural or existing body of water having dissolved monovalent ion salts salt and dissolved multivalent ion salts with a total dissolved salt content of at least 0.5 wt %, such as at least 0.75 wt %, 1 wt %, 1.25 wt %, 1.5 wt %, 1.75 wt %, 2.0 wt %, 2.25 wt %, 2.5 wt %, 2.75 wt %, 3.0 wt % and higher dissolved salts, e.g., seawater, hypersaline lakes, salt lakes, brine springs, etc.

Saline sources are desirable for ore processing operations principally because of their availability and supply. However, there are several problems with using saline sources such as seawater for extraction operations, such as floatation processes, which are not related to the principle salt components in the saline source, e.g., sodium and chlorine ions ($Na^+$ and $Cl^-$), but rather to multivalent or larger anions and cations such as $Mg^{2+}$, $Ca^{2+}$, $SO_4^{2-}$, $HCO_3^-$, $CO_3^{2-}$, $B(OH)_3/B(OH)_4^-$. See Li et al.; *RSC Adv.*, 2018, 8, 23364-23371.

For example, many copper mines extract chalcopyrite, an abundant copper-based mineral, in producing copper. However, flotation of chalcopyrite in seawater has been found to be particularly challenging as a result of the adsorption of hydrophilic calcium and magnesium salts on mineral surfaces, which depresses flotation. See Li et al.; *Minerals Engineering* 2019, 139, 105862. At pH 11 and levels of $CaCl_2$ close to 110 ppm, chalcopyrite recovery was reduced from about 88% to 60%, while molybdenite recovery was reduced from about 76% to 62%. Magnesium salts at an equivalent concentration had a much larger effect, reducing chalcopyrite recovery from 88% to about 15%, while molybdenite recovery was reduced from 76% to 48%. However, at levels of about 10-20 ppm of these salts, chalcopyrite recovery was unaffected and molybdenite recovery was not as severely impacted. Hirajima et al.; *Minerals Engineering* 96-97 (2016) 83-93.

Attempts have been made to remove certain calcium and magnesium ions using lime and sodium carbonate. The concentration of calcium and magnesium ions could be reduced to 176 ppm and 190 ppm, respectively, using lime and sodium carbonate. The floatability of copper and molybdenum-based ores improved significantly, relative to untreated seawater. However, it was concluded that the concentration of calcium and magnesium ions needed to be reduced even further in order to optimize flotation. Further, using lime and sodium carbonate appear to form open flocs with calcium and magnesium ions which may be difficult to remove from tailings.

Laboratory studies have used sodium silicate and electrocoagulation to reduce calcium and magnesium salts from seawater. However, it is believed that large-scale implementation of these processes would not be economical since use of sodium silicate would likely involve uneconomically large quantities for typical mining operations and electrocoagulation results in the evolution of hydrogen gas and is non-specific, removing nearly all water-soluble ions. Large-scale implementation of extracting mineral deposits in ore involves using at least 30 m³/hr of water and in many instances using at least 100 m³/hr, such as at least 250 m³/hr, 500 m³/hr.

Unlike multivalent ions, salts of the most common monovalent ions found in saline source such as seawater ($Na^+$, $K^+$ and $Cl^-$) are believed to have a beneficial effect on the flotation of hydrophobic ores relative to flotation in pure water or tap water. Without being bound by theory, it is believed that this is related to the stabilization of small air bubbles in saline solutions. Small bubbles can improve flotation but coalesce in low-salt concentration solutions. In treated saline water, however, coalescence can be inhibited through effects on the electrical double layer on the bubble surface. Hence, an advantage of the present disclosure is treating a saline source to reduce problematic multivalent ions but maintain a certain concentration of monovalent ions in the treated saline water and using the treated saline water for ore processing operations. Use of such treated saline water can improve yields of recovered minerals by about 0.5%, 1%, 2%, 3%, 4% and higher relative to use of water without appreciable amount of dissolved salts or untreated seawater.

In practicing certain aspects of processes of the present disclosure, a saline source is treated to reduce a concentration of one or more problematic multivalent ions, e.g., one or more of $Mg^{2+}$, $Ca^{2+}$, $SO_4^{2-}$, $HCO_3^-$, $CO_3^{2-}$, $B(OH)_3/B(OH)_4^-$. Advantageously, the processes of the present disclosure can treat a saline source to reduce a concentration of one or more multivalent ions dissolved in the saline source to produce a saline water having no more than a total concentration of $Mg^{2+}$, $Ca^{2+}$, $SO_4^{2-}$, ions of no more than about 500 ppm, e.g., no more than about 350 ppm, or 200 ppm or less. For example, treating a saline source by nanofiltration can reduce a concentration of any one of, or a concentration all of, $Mg^{2+}$, $Ca^{2+}$, $SO_4^{2-}$ ions to no more than about 200 ppm, such as no more than about 175 ppm, 150 ppm, 125 ppm, 100 ppm, 75 ppm, 50 ppm, 30 ppm, 20 ppm, 10 ppm and values therebetween.

While nanofiltration reduces problematic multivalent ions, treating a saline source by nanofiltration maintains a high concentration of dissolved monovalent salts, e.g., sodium and potassium chloride, of no less than about 0.5 wt %, such as at least about 1 wt %, 1.5 wt %, 2 wt %, 2.5 wt % and even at least about 2.9 wt %. Hence a treated saline source by nanofiltration can produce saline water having a concentration of any one of, or a concentration all of, $Mg^{2+}$, $Ca^{2+}$, $SO_4^{2-}$ ions to no more than about 200 ppm (such as no more than about 175 ppm, 150 ppm, 125 ppm, 100 ppm, 75 ppm, 50 ppm, 30 ppm, 20 ppm, 10 ppm and values therebetween) and a concentration of dissolved monovalent salts, e.g., sodium and potassium chloride, of no less than about 0.5 wt % (such as at least about 1 wt %, 1.5 wt %, 2 wt %, 2.5 wt % and even at least about 2.9 wt %).

An additional advantage of the process of the present disclosure is that nanofiltration allows for high through put of water. Hence, processes of the present disclosure can treat a saline source with high throughput such as treating at least 30 m³/hr of a saline source and in many instances treating at least 100 m³/hr, e.g., as at least 250 m³/hr, 500 m³/hr, or higher of a saline source of water.

Nanofiltration is similar to reverse osmosis, but uses membranes with more open pores. These membranes also have a surface electrostatic charge, so that they selectively reject large multivalent ions, while monovalent ions ($Na^+$, $K^+$, $Cl^-$) are to a larger degree allowed passage. Nanofiltration has previously been considered as a pretreatment process to remove particulates, microorganisms and organic and dissolved organic contaminants from seawater prior to desalination by reverse osmosis. (Kaya et al.; Desalination 369 (2015) 10-17). It has also been proposed that nanofiltration could be used to recover copper ions dissolved is an acid stream (van der Merwe; The Journal of the South African Institute of Mining and Metallurgy, November/December 1996, 339-342).

With the appropriate choice of nanofiltration membranes, the concentration of problematic multivalent ions can be reduced to very low levels (less than about 100 ppm, such as to about 10-40 ppm), which is almost a tenth of what has been achieved by precipitation with lime and sodium carbonate. Nevertheless, the total dissolved monovalent salts is about 2.9 wt %. The remaining salts comprise mainly sodium, potassium and chlorine ions with dissolved sodium chloride at about 2.8 wt %. Table 1 below shows an example of a seawater as a saline source with concentrations of dissolved salts before and after treatment by passing the seawater through nanofilters.

TABLE 1

Concentration of major ions in seawater before and after nanofiltration (NF).

|  | Seawater | NF Permeate (treated saline water) | NF Brine |
|---|---|---|---|
| Total Dissolved Solids (TDS) | 4.06% | 2.89% | 6.20% |
| $HCO_3^-$ | 0.0185% | 0.0084% | 0.0369% |
| B | 0.0006% | 0.0005% | 0.0008% |
| $Na^+$ | 1.2827% | 1.0859% | 1.6418% |
| $K^+$ | 0.0740% | 0.0576% | 0.1083% |
| $Mg^{2+}$ | 0.1657% | 0.0019% | 0.4645% |
| $Ca^{2+}$ | 0.0626% | 0.0016% | 0.1741% |
| $Cl^-$ | 2.2167% | 1.7254% | 3.1133% |
| $SO_4^{2-}$ | 0.24% | 0.0051% | 0.6687% |

As shown in Table 1 above, seawater can be treated to remove a certain level of multivalent ions (e.g., $Ca^{2+}$, $Mg^{2+}$, $SO_4^{2-}$) by passing the seawater through one or more nanofilters to provide a treated saline water with a reduction of such ionic components, e.g., to a level of less than about 200 ppm (0.0200 wt %), such as less than about 100 ppm and no more than about 50 ppm of each of such multivalent ion. The treated seawater produces a treated saline water, however, still having a high concentration of dissolved monovalent salts, e.g., sodium and potassium chloride, of preferably no less than about 1 wt %, 1.5 wt %, 2 wt %, 2.5 wt % and even at least about 2.9 wt % of dissolved monovalent salts.

Advantageously, nanofiltration can operate at lower pressures than reverse osmosis and operating costs can thus be significantly lower than reverse osmosis. Furthermore, nanofiltration membranes can be retrofitted to reverse osmosis pressure vessels. It follows that an additional advantage of using nanofiltration for treating seawater is that the very large capital investments in desalination plants that have been made by the industry would not be wasted by a switch to using nanofiltration in process of the present disclosure. Hence, seawater treated to remove or minimize problematic ionic components can then be used in a flotation operation to extract minerals from ore.

Figure 2:
FIG. 2 shows a picture of a piece of consolidated solids produced after treating copper tailings with a modified sea salt solution containing polyacrylamide and dewatering the consolidated material in a plate-and-frame press.

Further, the treated seawater can be used to obtain a fast consolidation of tailings stream (treated seawater/gangue) that remains after valuable ores have been extracted by flotation. This dewatering step is promoted by solutions containing dissolved NaCl and other dissolved monovalent salts. Other components can also be included in the dewatering step such as one or more flocculating polymers, e.g., non-ionic polyacrylamides and/or copolymers thereof. This combination can result in a fast consolidation of tailings streams to high solids content materials. FIGS. 1 and 2 described in the examples below illustrate such a fast consolidation of tailings.

In an aspect of the present disclosure, treated saline water, produced from treating a saline source by nanofiltration, can be used to extract minerals from ore such as by flotation. In a flotation operation according to the present disclosure, treated saline water having a low concentration of dissolved problematic multivalent ions (e.g., $Mg^{2+}$, $Ca^{2+}$, $SO_4^{2-}$ ions) and a high concentration of dissolved monovalent ion salts, e.g., sodium and potassium chloride ions, is used such that the flotation medium has a concentration of dissolved monovalent salts of no less than about 0.5 wt %, e.g., at least about 1 wt %, 1.5 wt %, 2 wt %, 2.5 wt %, etc. Such a flotation operation would separate a mineral concentrate stream from a waste (tailings) stream.

The tailings generated in such a flotation operation would also include the treated saline water such that the tailings can have a dissolved monovalent salt concentration of no less than about 0.5 wt %, 1 wt %, 1.5 wt %, 2 wt %, 2.5 wt % and even at least about 2.9 wt %. Such generated tailings can be treated with a polymer flocculant to facilitate consolidation of solid materials in the tailings to form a treated tailings including consolidated solids in process water. Advantageously, the process of the present disclosure can consolidate the solids of tailings to produce a consolidated material having a solids content in excess of about 50% by weight, e.g., a solids content of greater than about 55% and higher than about 60%, 65%, 70% and 75% by weight.

Flocculating polymers that can be used in practicing the present disclosure include polyacrylamides or copolymers thereof such as a nonionic polyacrylamide, an anionic polyacrylamide (APAM) such as a polyacrylamide-co-acrylic acid, and a cationic polyacrylamide (CPAM), which can contain co-monomers such as acryloxyethyltrimethyl ammonium chloride, methacryloxyethyltrimethyl ammonium chloride, dimethyldiallyammonium chloride (DM-DAAC), etc. Other water soluble flocculating polymers useful for practicing the present disclosure include a polyamine, such as a polyamine or quaternized form thereof, e.g., polyacrylamide-co-dimethylaminoethylacrylate in quaternized form, a polyethyleneimine, a polydiallyldimethyl ammonium chloride, a polydicyandiamide, or their copolymers, a polyamide-co-amine, polyelectrolytes such as a sulfonated polystyrenes can also be used. Other water soluble polymers such as polyethylene oxide and its copolymers can also be used.

Although most commercial flocculating polymers can be used in the process described herein, the minerals extraction industry presently relies largely on anionic and cationic polyacrylamide copolymers to thicken tailings. However, anionic and cationic polyacrylamide copolymers can foul membranes in nanofilters and reverse osmosis devices, among others. Certain cationic polyacrylamides are also acutely toxic to fish. An additional advantage of the process described herein is that a non-ionic polymer flocculant, e.g., a non-ionic polyacrylamide or copolymer thereof, works well in combination with dissolved monovalent salts, such as those included in treated saline water, in consolidating tailings. In addition, non-ionic polymer flocculants, e.g., polyacrylamide homopolymer, tend to be less expensive than anionic and cationic counterparts and also less harmful to aquatic life. In some embodiments of the present disclosure, the tailings can be treated with one or more polymer flocculants at a dose (weight of the flocculant(s) to weight of the solids in the tailings) of not less than zero and up to about 0.001 wt %, e.g., up to about 0.005 wt % such as up to about 0.01 wt % and in some implementations up to about 0.015 wt %, 0.020 wt %, 0.025 wt %, 0.03 wt %, or 0.04 wt %.

Another aspect of the preset disclosure is an integrated water management system that can combine the following elements. Treating a saline source, e.g., seawater, to reduce a concentration of one or more multivalent ions ($Ca^{2+}$, $Mg^{2+}$, $SO_4^{2-}$) dissolved in the saline source to low levels (no more than 200 ppm, such as no more than 100 ppm or 50 ppm or even 30 ppm of each of $Ca^{2+}$, or $Mg^{2+}$, or $SO_4^{2-}$) by passing the saline source through one or more nanofilters to produce a treated saline water while maintaining a desired concentration of flotation beneficial monovalent ions, e.g., a concentration of at least about 1 wt %, 1.5 wt %, 2 wt %, 2.5 wt % and even at least about 2.9 wt % of dissolved monovalent ions such as sodium chloride. The treated saline water can be used in a flotation operation to extract minerals from ore. In such a process, monovalent salts can have a positive effect on yields of extracted minerals from the ore. Flotation operations separate desirable minerals from unwanted waste by producing a mineral concentration stream and a tailings stream. The generated tailings include the treated saline water such that the tailings can have a concentration of dissolved monovalent salts of no less than about 0.5 wt %, 1 wt %, 1.5 wt %, 2 wt %, 2.5 wt % and even at least about 2.9 wt %. Such generated tailings can be treated with one or more polymer flocculants, if needed, to form a treated tailings to consolidate solids in the tailings to form a consolidated material in process water. Such treated tailings can achieve a fast dewatering of the tailings stream to give a high solids content, mostly dry, stackable solids with process water which can be separated from the consolidated solids. At least a portion of the separated process water, and preferably most if not all of such process water, can be recovered and cycled back to ore extraction operations, e.g., flotation operations or subjected to a water management circuit, or both. The consolidated solids separated from the process water can then be disposed with or without an additional mechanical and/or thermal dewatering step.

Further, management of the water chemistry of the recovered and cycled process water can be adjusted to improve mineral recovery in flotation operations. This can be achieved by purifying the recovered and cycled process water to some degree by reverse osmosis or by nanofiltration or both. Such a step has an advantage that unwanted salts or other contaminants from processing aids or leached from the ore which can accumulate, can be removed.

An advantage of a water management system according to the present disclosure is a reduction of the size of tailings ponds typical for large mining operations and the concomitant reduction of contaminated water into soil surrounding mining sites. Advantages of an integrated water management system according to the present disclosure can be understood by comparing the flow diagrams in FIGS. 3 and 4.

Figure 3:
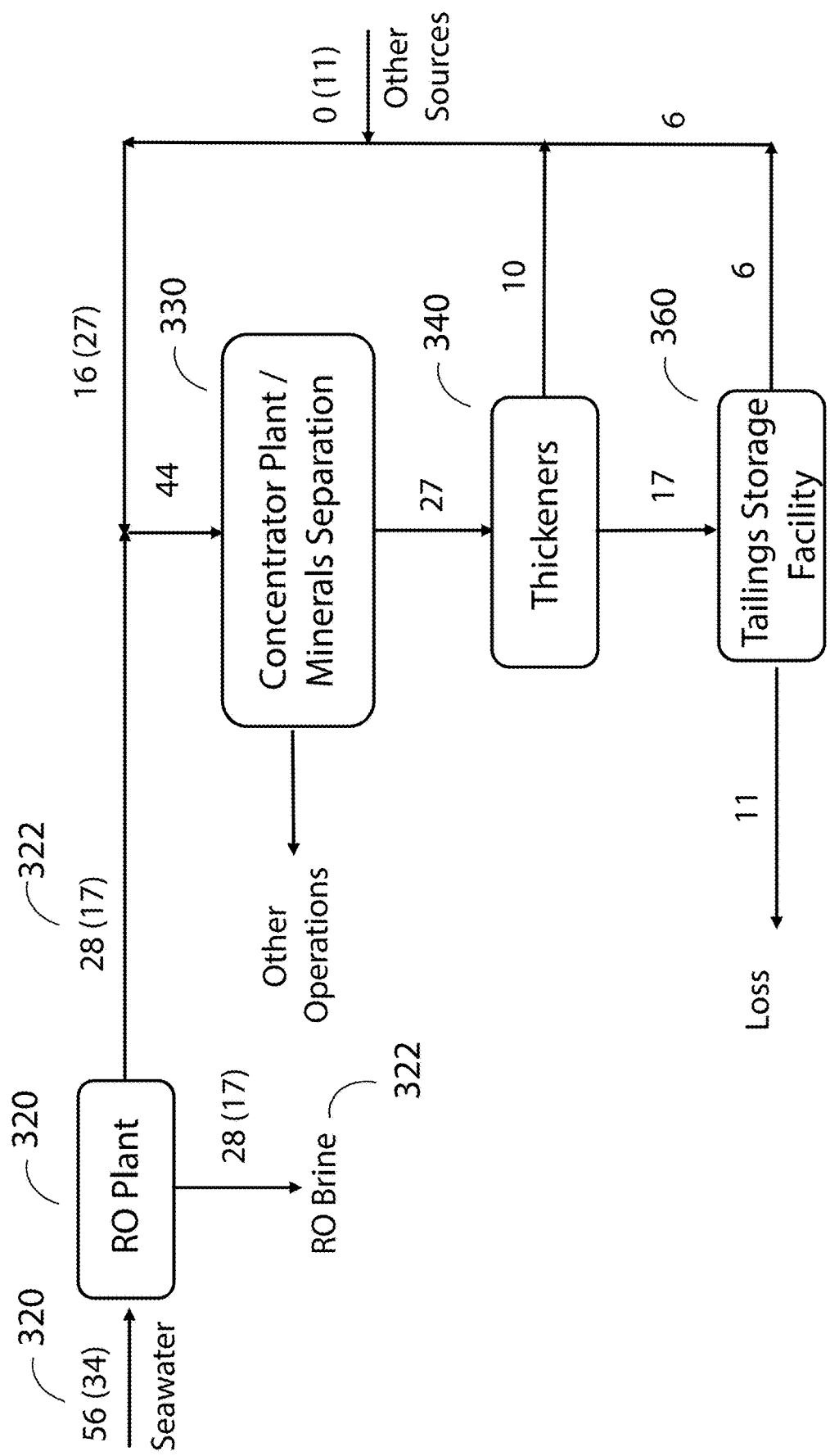
FIG. 3 is a process flow diagram illustrating water flows in a concentrator plant processing 17.5 million metric tons per year of ore. The numeric values show in the figure are in millions of metric tons/year (Mt/yr).

FIG. 3 shows a schematic flow diagram for a conventional copper flotation process. The numeric values shown in the figure are based on data reported by Bleiwas, D. I., 2012, Estimated water requirements for the conventional flotation of copper ores: U.S. Geological Survey Open-File Report 2012-1089, 1-13, available at http://pubs.usgs.gov/of/2012/1098/. The flow diagram is based on treating 17.5 millions of metric tons/year (Mt/yr) of copper ore. The numbers on the flow chart show the amount of water in Mt/year that are required for a conventional process using desalinated seawater (310) by reverse osmosis (320). Numbers in parenthesis assume that there is also a supplemental freshwater source that can be used (as in some world locations). Essentially, when using seawater alone, 56 Mt/year of seawater would have to be subject to reverse osmosis, producing 28 Mt/year of desalinated water (322) and 28 Mt/year of brine (324). The desalinated water would then have to be pumped from the shore to the mine site. Such pumping can involve very large expenditures of energy, as some mine sites are a considerable distance from seawater and at an elevation higher than sea level. The desalinated water is then used in extraction operations at the Concentrator plant (330) to separate desirable minerals from ore which generates a tailings stream, which is treated with polymer and consolidated in thickeners (340). In conventional processes, such tailings are thickened to a solids content of 50-55%. The thickened tailings is then pumped to a tailings storage facility (360), such as an impoundment pond, where some of the process water is recovered and recycled into the process.

Figure 4:
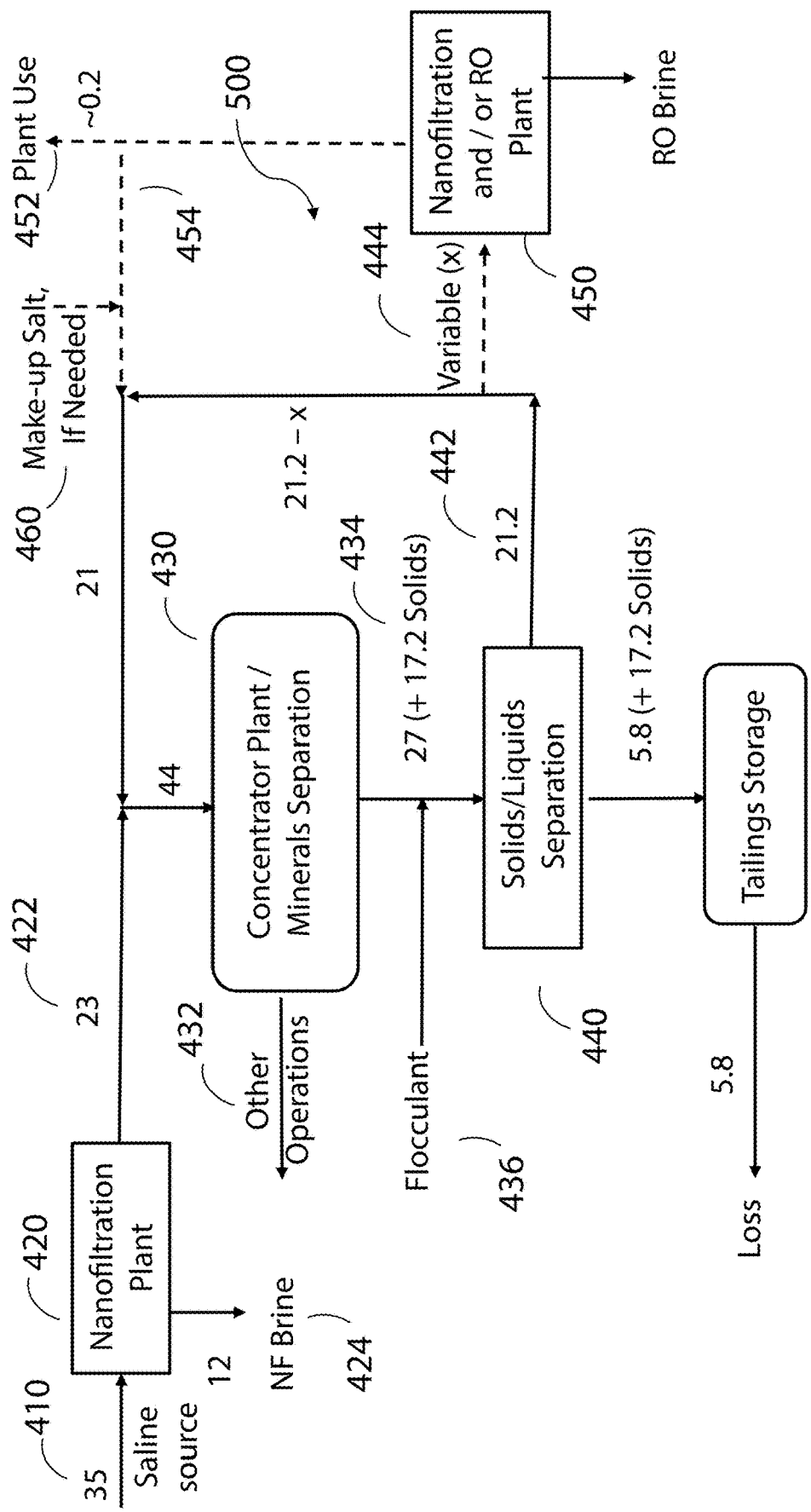
FIG. 4 is a process flow diagram illustrating water flows in a concentrator plant processing 17.5 Mt/yr of ore according to aspects of the present disclosure. The numeric values are in millions of metric tons/year (Mt/yr).

FIG. 4 illustrates treating 17.5 Mt/yr of copper ore but using an integrated water management system according to the present disclosure. The amount of water needed for processing the same amount of copper ore (17.5 Mt/yr) is considerable less than the process illustrated in FIG. 3 (35 mt/yr versus 56 Mt/yr). The reduction in water use is primarily due to a combination of improved tailings consolidation and water management of cycled process water.

For this example, seawater is used as a saline source. The process includes treating about 35 Mt/yr of seawater (410) by nanofiltration (420) to reduce a concentration of one or more multivalent ions ($Ca^{2+}$, $Mg^{2+}$, $SO_4^{2-}$) dissolved in the seawater to low levels (no more than about 200 ppm) to produce about 23 Mt/yr of treated saline water (422) and a nanofiltered brine (NF brine, 424). Such treated saline water can still maintain a high concentration of dissolved monovalent salts, e.g., at least about 0.5 wt % such as at least about 1 wt %, of dissolved monovalent salts such as dissolved sodium chloride. As illustrated in FIG. 4, the treated saline water is used in a concentrator plant (430) to separate minerals from ore such as in a flotation operation.

The flotation operation separates desirable minerals by producing a mineral-rich concentrate stream (432) and a waste tailings stream (434). Since the tailings were generated with the treated saline water, the tailings can have a dissolved monovalent salt concentration similar to the concentration of the treated saline water, e.g., at least about 0.5 wt %, 1 wt %, 1.5 wt %, 2 wt %, 2.5 wt % or higher dissolved monovalent salts such as sodium chloride.

The tailings can be dosed with a polymer flocculant (436), e.g., a non-ionic polymer flocculant such as a non-ionic polyacrylamide or copolymer thereof, to consolidate the solids in the tailings to form a consolidated material in process water. Use of a non-ionic polymer flocculant advantageously reduces fouling of membranes in nanofilters and reverse osmosis devices such that any residual polymer flocculant contained in process water cycled to a reverse osmosis or nanofiltration operation does not foul the membranes of the device.

Advantageously, the use of treated saline water with polymer flocculant allows consolidation of the solids in the tailings to a high solids content and in relatively short time periods. In some embodiments, the consolidated material can have a solids content of greater than about 50% and at least about 55%, 60%, 65%, 70%, 75% and 80% by weight after treating the tailings with a polymer flocculant and/or dewatering to separate the process water from the consolidated solids. Further it is believed the most common monovalent ions found in a saline source such as seawater ($Na^+$, $K^+$ and $Cl^-$) can have a beneficial effect on the flotation of hydrophobic ores and thus improve yields of ore extraction such as an increase of about 0.5%, 1%, 2%, 3%, 4% and higher yield of recovered minerals.

The consolidated solids can be separated from process water by a solids/liquids separation step (440) such as by use of decanters, plate-and-frame presses, hydrocyclones, gravity drainage in flumes, in-line filters, etc. The separation step can also dewater the consolidated solids during separation of the solids from the process water. The high solids content and dewatering of the treated tailings can allow an increase in cycled water of more than 30%, with a corresponding decrease in the amount of treated seawater pumped from the coast (or other saline source), as compared to a conventional process illustrated in FIG. 3. In addition, the amount of water subject to nanofiltration is about 60% that subjected to reverse osmosis in a conventional process (compare FIGS. 3 and 4). In addition, the amount of water pumped to the mine site is reduced by close to 20%.

The cost of treated water is also significantly less, because nanofiltration operates at much lower pressures than reverse osmosis and at higher efficiencies, about 65% relative to 50%. Advantageously, treating a saline source by nanofiltration also produces much less brine (~57% less) at a lower salt concentration.

Depending on the method used to separate and dewater consolidated solids from treated tailings, and the composition of the tailings, the final water content of the consolidated solids may be lower than that specified for disposal by local geotechnical standards for dry density. In certain additional aspects of the current process, the separated consolidated solids can be subjected to a finishing step such as one that involves one or more thermal methods to further dewatering the consolidated solids. Such thermal methods can include, for example, drum dryers, paddle dryers, disk dryers, belt dryers, microwave heating, etc. Microwave dryers would be particularly useful in certain applications because of their rapid rate of heating.

Also shown in FIG. 4 is a circuit to cycle process water separated from the solids/liquids separation step (440). Process water separated from the consolidated solids (442), or at least a portion thereof, can be directly cycling back to the concentration operation, e.g., flotation operation. In addition, process water separated from the consolidated solids (442), or at least a portion thereof (444), can be subjected to a process water management circuit (500). In circuit 500, separated process water, or at least a fraction thereof, can be subjected a purification process such as by a second nanofiltration process or a reverse osmosis process, or both (450). The fraction of process water subjected to a purification step is shown as Variable (x) in FIG. 4. The process water management circuit (500) can serve at least two functions. One is to supply desalinated water for general plant use (e.g., drinking water) (452).

The second function can be to manage process water chemistry cycled back to the concentrator operation (454) by reducing a concentration of problematic multivalent ions and/or to reducing other problematic materials. Although problematic multivalent ions are largely removed by the initial nanofiltration operation (420), the ore being treated may have salts containing calcium and magnesium (for example) that could leach into the tailings and separated process water stream. Although the solubility of these salts in water is generally low (calcium sulfate, for example, has a maximum solubility of about 0.26 g/100 g of water), there could accumulate over time and eventually have an adverse effect on recovery in flotation operations.

In addition, heavy metal contaminants such as lead, arsenic and mercury can be released from the parent ore during processing and enter the process water stream. Reverse osmosis can reduce or remove these ions to much lower levels than nanofiltration, 2 ppm or less. In order to manage water quality, desalinated water from a reverse osmosis loop (454) can be cycled to the concentrator process (430) in sufficient quantities to reduce the concentration of any problematic ions in the unpurified cycled process water (442) to an acceptable level. If necessary, the concentration of monovalent salts in this stream can be adjusted by the addition of a sodium chloride source (460).

In certain aspects of the present process, process water chemistry can be monitored continuously and controlled by the process water management circuit (500) shown schematically in FIG. 4. The nanofiltration and/or reverse osmosis configuration and operation in a water management circuit will vary with the concentration and nature of the salts in the process water stream.

Examples

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Consolidation of Copper Tailings.

Fast consolidation of copper tailings is illustrated in FIG. 1. For this experiment, two copper tailings samples containing 23% solids were mixed with one of two solutions. In the first case, the copper tailings were mixed with an equal volume of tap water (as a control) and in the second case with a solution including about 3.5% salt and 0.1% non-ionic polyacrylamide to form two suspensions. The salt was a sea salt from which divalent ions ($Ca^{2+}$, $Mg^{2+}$ and $SO_4^{2-}$) had been reduced significantly (from 417 ppm, 1255 ppm and 2727 ppm, respectively, to 39 ppm, 25 ppm and 61 ppm, respectively). The solution including about 3.5% modified sea salt was designed to be an equivalent to nanofiltered seawater.

The two suspensions were then poured into measuring cylinders, as shown in FIG. 1. After about 41 seconds of forming the suspensions, the bottom picture in FIG. 1 was taken. It can be seen that the control cylinder (left) showed little or no settling during the 41 second time period. However, the suspension including principally dissolved monovalent salt and a non-ionic polymer flocculant show the solids consolidated dramatically.

Without being bound to any particular theory, we believe particle suspensions, particularly those containing fine clay particles (a common gangue material in ore tailings), are inhibited in agglomeration by repulsive forces associated with the surface charge present on most minerals. As the ionic strength of the medium is increased such as by addition of dissolved monovalent salts in the tailings, the surface electrical double layer is compressed and the particle suspension is destabilized. A degree of aggregation then occurs that is enhanced by the co-use of flocculating polymers.

Further, although most commercial flocculating polymers can be used in the process described herein, the minerals extraction industry presently relies largely on anionic and cationic polyacrylamide copolymers to thicken tailings. Such anionic and cationic polyacrylamide copolymers can foul membranes. An additional advantage of the process described herein is that non-ionic flocculating polymers, such as polyacrylamide and co-polymers thereof, work well in combination with monovalent salts (see FIG. 1).

Samples of consolidated tailings prepared as described for FIG. 1 using an equivalent to nanofiltered seawater with polymer flocculant were pressed between paper towels and their solids content were determined to be 75% by drying. On a pilot scale, the use of a plate-and-frame press resulted in a consolidated materials with a solids content of over 90%. A picture of the solids removed from the press is shown in FIG. 2.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following embodiments.

What is claimed is:

1. A process of extracting a mineral from an ore, the process comprising:
    treating a saline source to reduce a first concentration of one or more multivalent ions dissolved in the saline source by a first treatment process including nanofiltration to produce a treated saline water having a second concentration of dissolved monovalent salts of at least 0.5 wt %;
    performing a first mineral recovery process that includes using a first volume of the treated saline water as a process water in a flotation operation to extract the mineral from a portion of the ore to form a tailings stream,
    performing a consolidation process that includes applying a second volume of the treated saline water to the tailings stream;
    dosing the tailings stream with a polymer flocculant to form a treated tailings stream, wherein the treated tailings stream has a third concentration of the dissolved monovalent salts of 0.5 wt % or more, wherein a dose of the polymer flocculant in the treated tailings stream is not less than 0.005 wt %, and wherein the dose of the polymer flocculant is a weight of the polymer flocculant to a weight of solids in the tailings stream;
    performing a liquid-solid separation operation to form a recovered water and a consolidated solid;
    purifying at least a first portion of the recovered water by a second treatment process to reduce a fourth concentration of the one or more multivalent ions in the recovered water to no more than 200 ppm in the purified recovered water, mixing the purified recovered water with the recovered water to form a mixed fluid, and cycling the mixed fluid to the flotation operation; and
    performing a second mineral recovery process that includes using the recovered water as the process water,
    wherein the saline source comprises seawater,
    wherein the saline source is treated at at least 30 m³/hr,
    wherein the polymer flocculant includes one or more selected from the group consisting of (a) polyacrylamide, (b) a polyamine, (c) a polyethyleneimine, (d) a polydicyandiamide, (e) a polyamide-co-amine, (f) a polyethylene oxide, and a copolymer of any of (a)-(f),
    wherein the one or more multivalent ions include calcium ions and magnesium ions,
    wherein the dissolved monovalent salts include sodium ions and chloride ions, and
    wherein the use of the treated saline water in the flotation operation improved yields of recovered mineral by 1% to 4% higher relative to use of untreated seawater.

2. The process of claim 1, wherein the one or more multivalent ions further include sulfate ions, and wherein treating the saline source reduces the first concentration of the one or more multivalent ions to no more than about 200 ppm in the treated saline water.

3. The process of claim 1, wherein the third concentration of dissolved monovalent salts is 0.5 to 2.9 wt %.

4. The process of claim 1, further comprising cycling at least a second portion of the recovered water to the flotation operation.

5. The process of claim 1, wherein the consolidated solid has a solids content of at least 50% by weight.

6. The process of claim 1, wherein the mineral includes copper-based minerals.

7. The process of claim 1, wherein the second concentration of dissolved monovalent salts 0.5 wt % to 3.5 wt %.

8. The process of claim 1, further comprising dewatering the consolidated solid by applying microwaves to the consolidated solid.

9. The process of claim 1, wherein the second concentration of dissolved monovalent salts is 0.5 wt % to 2.9 wt %.

10. The process of claim 1, wherein the consolidated solid has a solids content of 50% to 75% by weight.

11. The process of claim 1, wherein the first treatment process further includes a reverse osmosis process.

12. The process of claim 1, wherein the dose of the polymer flocculant is not less than 0.005 wt % and up to 0.04 wt %.

13. The process of claim 1, wherein the second treatment process includes the reverse osmosis process.

14. The process of claim 13, wherein the first treatment process further includes a reverse osmosis process,
    wherein the one or more multivalent ions include one or more selected from the group consisting of a calcium ion, a magnesium ion, and a sulfate ion,
    wherein treating the saline source reduces the first concentration of the one or more multivalent ions to no more than about 200 ppm in the treated saline water,
    wherein the second concentration of dissolved monovalent salts 0.5 wt % to 3.5 wt %,
    wherein the third concentration of dissolved monovalent salts is 0.5 to 2.9 wt %,
    wherein the mineral includes copper-based minerals, and
    wherein the dose of the polymer flocculant is not less than 0.005 wt % and up to 0.04 wt %.

15. The process of claim 1, wherein the second treatment process includes nanofiltration.

16. The process of claim 15, wherein the first treatment process further includes a reverse osmosis process,
    wherein the one or more multivalent ions include one or more selected from the group consisting of a calcium ion, a magnesium ion, and a sulfate ion,
    wherein treating the saline source reduces the first concentration of the one or more multivalent ions to no more than about 200 ppm in the treated saline water,
    wherein the second concentration of dissolved monovalent salts 0.5 wt % to 3.5 wt %,
    wherein the third concentration of dissolved monovalent salts is 0.5 to 2.9 wt %,
    wherein the mineral includes copper-based minerals, and
    wherein the dose of the polymer flocculant is not less than 0.005 wt % and up to 0.04 wt %.

17. The process of claim 1, wherein the second treatment process includes the reverse osmosis process and nanofiltration.

18. The process of claim 17, wherein the first treatment process further includes a reverse osmosis process,
    wherein the one or more multivalent ions include one or more selected from the group consisting of a calcium ion, a magnesium ion, and a sulfate ion, wherein treating the saline source reduces the first concentration of the one or more multivalent ions to no more than about 200 ppm in the treated saline water, wherein the second concentration of dissolved monovalent salts 0.5 wt % to 3.5 wt %, wherein the third concentration of dissolved monovalent salts is 0.5 to 2.9 wt %, wherein the mineral includes copper-based minerals, and wherein the dose of the polymer flocculant is not less than 0.005 wt % and up to 0.04 wt %.

19. The process of claim 1, further comprising dewatering the consolidated solid by (i) drum drying, (ii) paddle drying, (iii) disk drying, (iv) belt drying, (v) microwave heating, or a combination of any of (i) to (iv).

20. The process of claim 19, wherein the first treatment process further includes a reverse osmosis process, wherein the one or more multivalent ions include one or more selected from the group consisting of a calcium ion, a magnesium ion, and a sulfate ion, wherein treating the saline source reduces the first concentration of the one or more multivalent ions to no more than about 200 ppm in the treated saline water, wherein the second concentration of dissolved monovalent salts 0.5 wt % to 3.5 wt %, wherein the third concentration of dissolved monovalent salts is 0.5 to 2.9 wt %, wherein the mineral includes copper-based minerals, and wherein the dose of the polymer flocculant is not less than 0.005 wt % and up to 0.04 wt %.

* * * * *